United States Patent [19]

Harsdorff

[11] Patent Number: 4,990,000
[45] Date of Patent: Feb. 5, 1991

[54] ROLLER BEARING

[75] Inventor: Ortwin Harsdorff, Zell, Fed. Rep. of Germany

[73] Assignee: SKF GmbH, Schweinfurt, Fed. Rep. of Germany

[21] Appl. No.: 489,456

[22] Filed: Mar. 6, 1990

[30] Foreign Application Priority Data

Mar. 23, 1989 [DE] Fed. Rep. of Germany ....... 3909557

[51] Int. Cl.$^5$ ..................... F16C 43/04; F16C 33/58; B60B 27/00
[52] U.S. Cl. .............................. 384/542; 301/105 R; 384/544; 384/585
[58] Field of Search ............... 384/513, 514, 542–544, 384/562, 564, 584, 585, 586, 589; 301/105 R, 111, 114

[56] References Cited

U.S. PATENT DOCUMENTS

| | | | |
|---|---|---|---|
| 2,206,323 | 7/1940 | Hughes | 384/544 |
| 2,540,316 | 2/1951 | Ash | 301/105 R |
| 4,527,916 | 7/1985 | Asberg | 384/513 |
| 4,749,288 | 6/1988 | Tilch et al. | 384/542 X |
| 4,811,992 | 3/1989 | Steiner | 301/105 R |
| 4,900,166 | 2/1990 | Candiard | 384/564 X |

FOREIGN PATENT DOCUMENTS 7434724 1/1975 Fed. Rep. of Germany.

Primary Examiner—Thomas R. Hannon
Attorney, Agent, or Firm—Rosen, Dainow & Jacobs

[57] ABSTRACT

A rolling bearing especially adapted for vehicle wheels or the like, has an inner part, an outer ring and, one or more rows of rolling elements rolling between the inner part and the outer ring. The outer ring has a bore with outer races for the rolling elements and a flange projecting radially outward, the flange having a locating face at one end thereof. The locating face contains holes for the attachment of the flange to the mating face of a connecting element by screws. In order to allow the holes of the flange of the outer ring to become distributed along an extremely small reference diameter on the locating face, they extend obliquely radially outward from the locating face at an acute angle with respect to the bearing axis.

10 Claims, 2 Drawing Sheets

ROLLER BEARING

FIELD OF THE INVENTION

This invention relates to rolling bearings, and is more in particular directed to a rolling bearing especially adapted for use with vehicle wheels.

BACKGROUND OF THE INVENTION

A rolling bearing of the type with which the invention is concerned, as disclosed in DE-GM No. 7 434 724, has threaded holes in the flange of its outer ring which extend parallel to the bearing axis. A disadvantage of this rolling bearing is the fact that the threaded holes are located relatively close to the outer race or races of the outer ring so that they may weaken the outer ring considerably when the pitch diameter is greatly reduced in order to provide a compact rolling bearing, for example, for automobile wheels. During the operation of the rolling pulsating contact stress due to rolling is propagated from the rolling elements to the raceway of the outer ring and to the threads of the holes, often causing the threads to tear due to fatigue.

SUMMARY OF THE INVENTION

It is therefore an object of the invention to provide an improved rolling bearing of the above kind which, notwithstanding its compact construction with an extremely small reference diameter, may be provided with holes in the locating face of the flange of the outer ring without affecting the sturdiness and durability of the outer ring. In addition, the rolling bearing should be economical to manufacture.

In the rolling bearing of the invention the radial distance between each hole in the flange and the bearing axis increases as the lateral distance thereof from the locating face of the flange increases. Accordingly, the concentrated contact tension of the rolling elements on the outer races of the outer ring will dissipate before it reaches the holes in the flange. In addition, the openings of the holes of the locating face may be distributed over a relatively small reference diameter without any negative effect on the sturdiness of the outer ring. The flange of the outer ring requires relatively little space in a radial direction, so that the outer ring will advantageously not weigh much. A compact design gives the rolling bearing extreme sturdiness and long durability. This is of crucial significance above all for applications in heavyduty vehicle wheels, e.g. for truck wheels.

In accordance with the invention the pitch diameter of the holes in the locating face may be unusually small. Again, the rolling bearing requires little space so that it can be easily incorporated into a vehicle wheel.

Still further in accordance with the invention, the conical locating face of the flange transfers a large part of the radial and axial load of the rolling bearing to the mating face of the connecting element, thereby relieving the load on the screws in the holes of the flange of the outer ring. Accordingly, it is be possible, in many cases, to use screws with a relatively small diameter for attaching the flange to the connecting element.

In addition the invention provides extremely shock-proof radial support to the outer ring of the element.

The outer edge of the flange may be supported in the locating hole of the connecting element and may be cylindrical.

In a further embodiment of the invention a substantially rotation-proof connection is provided between the locating face of the flange and the mating face of the connecting element.

The rotation-proof arrangement, which may include relatively soft projections, renders it possible, when attaching the flange to the mating face of the connecting element, to slightly deform the rotationally fixing projections on the locating face of the flange. As a result, minor defects in shape which may exist between both locating faces are automatically compensated during mounting.

In a still further embodiment of the invention, the hardened surface layer of the outer race of the outer ring does not extend to the area of the flange holes. Accordingly, these holes may be made e.g. drilled after the surface hardening of the outer races (by case-hardening or induction), in a relatively soft, unhardened area of the outer ring. This provides an economical manufacturing process with a high degree of precision with respect to the shape of the holes.

BRIEF DESCRIPTION OF THE DRAWINGS

In order that the invention may be more clearly understood, it will now be disclosed in greater detail with reference to the accompanying drawings, wherein.

DETAILED DISCLOSURE OF THE INVENTION

Figure 1:
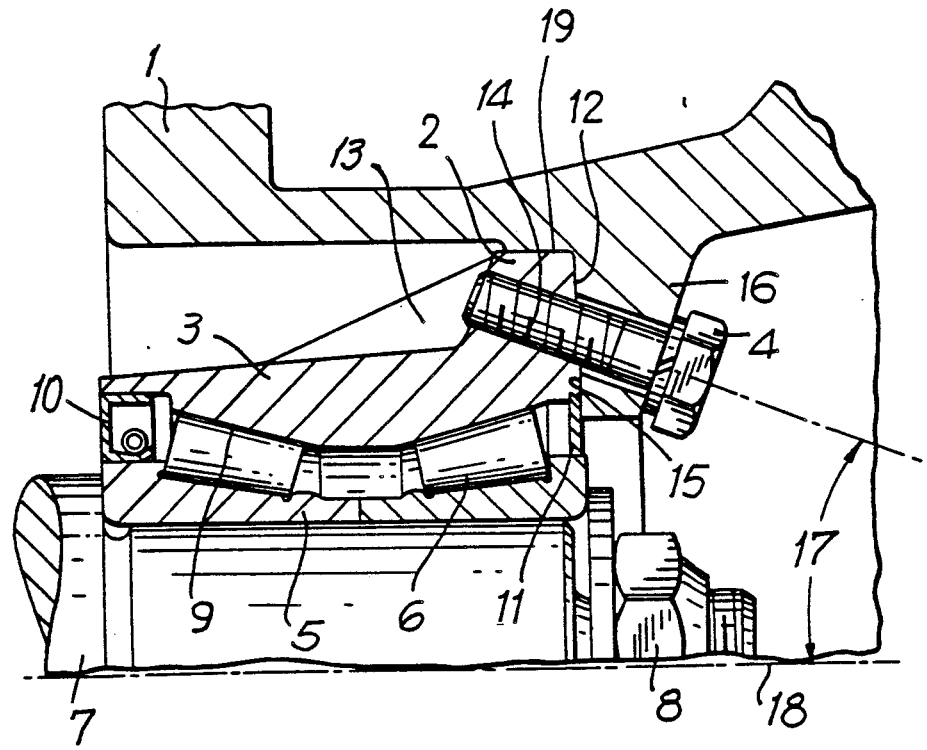
FIG. 1 is partial longitudinal section through a rolling bearing with an outer ring whose flange has a flat radially extending locating face.

Referring now to FIG. 1, the wheel carrier 1 is a connecting element for a rolling bearing, this carrier being a rim of a car wheel. The wheel carrier 1 is attached to a radially outward projecting flange 2 of the outer ring 3 of the rolling bearing with screws 4.

The rolling bearing includes the outer ring 3, an inner ring which may be comprised of two rings 5, and two rows of conical rolling elements 6 located between the outer ring 3 and the two inner rings 5. The inner rings 5 are fastened to a wheel axle 7 and laterally held by a nut 8.

The outer ring 3 has a bore with two conical outer races 9, each for a separate row of the rolling bearings 6. This ring is forged and its surfaces have been hardened over its outer races 9. Sealing rings 10, 11 are mounted in the bore at the ends of the outer ring 3. The sealing ring 10 sealingly slides on the corresponding inner ring 5. The sealing ring 11 is a cover disk forming a narrow sealing gap with a shoulder of the corresponding inner ring 5.

The flange 2 of the outer ring 3 has longitudinal ribs 13 to provide rigidity to this ring. It also has a locating face 12 at one end which contains threaded holes 14 for attaching the flange 2 with its locating face 12 abutting a mating face 15 of a counter-flange of the wheel carrier 1. The attachment of flange 2 to the counter-flange 16 is effected with screws 4, each of which passes through a corresponding hole of the counter-flange 16 and is screwed tightly in a threaded hole 14 of the flange 2.

The threaded holes 14 are on a common pitch circle in the locating face 12, and this circle has a relatively small diameter. The holes 14 extend outward from the locating face 12 at an acute angle 17 to the bearing axis 18, through the flange 2.

The locating face 12 of the flange 2 extends inward to the bore of the outer ring 3. In the arrangement of FIG. 1 the face 12 is flat and extends in a radial direction. In a similar fashion, the corresponding mating face 15 of the counter-flange 16 is flat and extends radially. The openings of the threaded holes 14 facing the counter-flange 16 are located in the immediate vicinity of the bore of the outer ring 3.

The flange 2 has a cylindrical outer edge 19 that is concentric with the bearing axis 18, the outer edge 19 fitting in a cylindrical locating bore of the wheel carrier 1.

Figure 2:
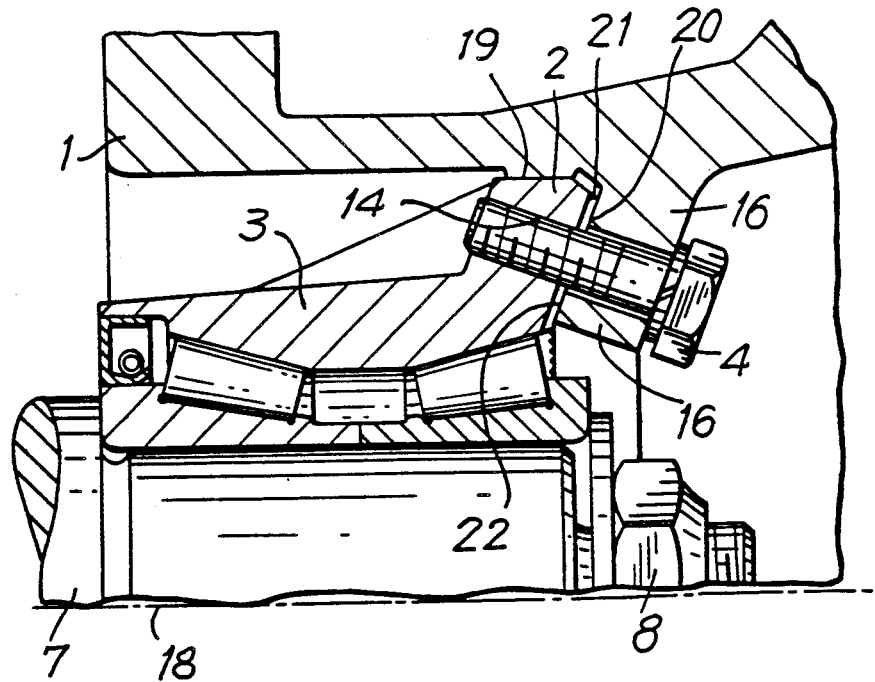
FIGS. 2 and 3 are partial longitudinal sections through rolling bearings in accordance with two further embodiments of the invention, each having an outer ring whose flange has a conical locating face with radial teeth.

FIG. 2 illustrates a rolling bearing with an outer ring 3 having a flange 2. At its right hand end, as illustrated in the drawing, the flange 2 has a conical locating face 20. Projections are arranged over the perimeter of the locating face 20 and, in this embodiment of the invention the projections are essentially in the form of radially extending teeth 21 of a serration, which is well-known in itself. The teeth 21 enable an interlocking connection with corresponding teeth on the conical face 22 of the counter-flange 16, thereby preventing any mutual rotation between the counter-flange 16 and the flange 2 of the outer ring 3. The threaded holes 14 of flange 2 extend outward from the conical locating face 20 toward the bearing axis 18 along a radial diagonal, and are perpendicular to the locating face 20.

When the screws 4, for example cap screws, are tightened, they are screwed into a threaded hole 14 of the flange 2, so that the flange 2 is fastened with its conical locating face 20 onto the conical mating face 22 of the wheel carrier. Thereby the teeth 21 of the conical locating face 20 may undergo a slight plastic deformation. The centering of the outer ring 3 in the wheel carrier rim is effected by the cylindrical outer edge 19 which extends without play in a cylindrical locating bore of the wheel carrier 1.

Figure 3:
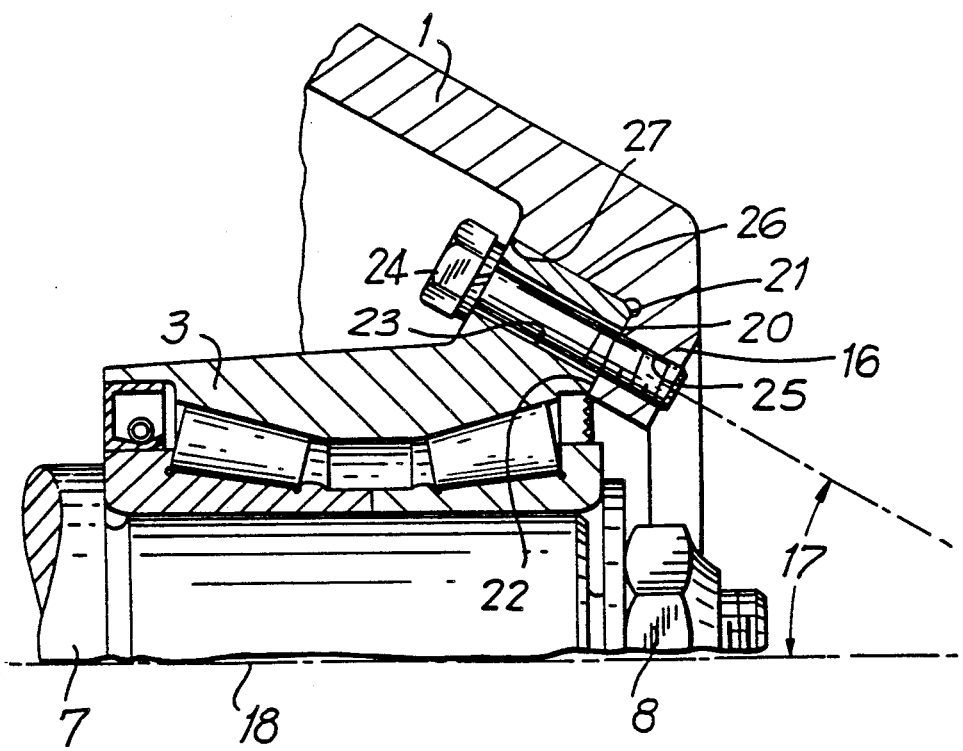

FIG. 3 illustrates a rolling bearing of a design similar to the bearing in FIG. 2. At the perimeter of flange 2 of the outer ring 3, holes 23 are provided that extend completely through the flange. The median lines of these holes 23 extend outward from the conical locating face 20 at an acute angle 17 to the bearing axis 18. They are perpendicular to the conical locating face 20 of flange 2. The openings of the holes 23 are located in the immediate vicinity of the bore of the outer ring 3.

In this embodiment of the invention, the holes 23 of the flange 2 are cylindrical (i.e. not threaded). Each of the corresponding cap screws 24 extends through a separated hole 23 and the end of the screw is threaded into a threaded hole 25 of the counter-flange 16.

The locating face 20 has serrated projecting teeth 21 adapted to mesh with corresponding teeth of the mating face 22 and which may undergo a slight plastic deformation when the locating face 20 is fastened and pressed onto the mating face 22.

The radial attachment of the outer ring 3 to the wheel carrier 1 is effected by conical outer edge 26 which extends perpendicularly to the conical locating face 20, and is concentrical with the bearing axis 18. This conical outer edge 26 is fastened in a conical locating bore 27 of the wheel carrier 1.

The embodiments of the rolling bearing described above lend themselves to structural changes within the scope of the invention. For example only, the mounting holes of the flange of the outer ring need not extend all the way through the flange, rather, they may be blind holes.

The rolling elements between the outer ring and the inner part of the rolling bearing may be arranged in a single row and, in addition, they may be cylindrical or spherical in shape. In many cases the inner part of the rolling bearing may be a part of the wheel axle itself, whereby the rolling elements will then roll in one or more rows directly on the wheel axle.

What is claimed is:

1. In a rolling bearing having an inner part, an outer ring and a plurality of rolling elements arranged in one or more rows between the inner part and the outer ring, wherein the outer ring has a bore with outer races for the rolling elements and a flange projecting radially outward with a locating face at one end thereof, the locating face of the flange having holes for the attachment of the flange with its locating face against the mating face of a connecting element, with screws or the like, the improvement wherein said holes in the flange extend obliquely radially outward from the locating face at an acute angle to the bearing axis.

2. The rolling bearing of claim 1, wherein the locating face of the flange extends to the bore of the outer ring and the openings of the holes of the flange are in the immediate vicinity of this bore.

3. The rolling bearing of claim 1, wherein the locating face of the flange of the outer ring is conical and the holes of the flange are perpendicular to this face.

4. The rolling bearing of claim 1, wherein the flange of the outer ring has a radially outer edge which is concentric to the bearing axis of the rolling bearing and extends into a locating bore of the connecting element.

5. The rolling bearing of claim 4, wherein the radially outer edge of the flange of the outer ring is cylindrical.

6. The rolling bearing of claim 1, wherein projections are formed on the locating face of the flange of the outer ring for an interlocking connection with the connecting element.

7. The rolling bearing of claim 6, wherein the projections on the locating face of the flange of the outer ring comprise radially extending teeth of a serration.

8. The rolling bearing of claim 1, wherein the holes of the flange of the outer ring are threaded holes.

9. The rolling bearing of claim 1, wherein each of the holes of the flange extend through the flange.

10. The rolling bearing of claim 1, wherein the outer ring is forged and at least the outer races at its bore are surface-hardened.

* * * * *

UNITED STATES PATENT AND TRADEMARK OFFICE
CERTIFICATE OF CORRECTION

PATENT NO. : 4,990,000

DATED : February 5, 1991

INVENTOR(S) : Ortwin Harsdorff

It is certified that error appears in the above-identified patent and that said Letters Patent is hereby corrected as shown below:

Column 1, line 63, after "outer ring of the" insert --rolling bearing in the locating hole of the connecting--.

Signed and Sealed this

Eighth Day of September, 1992

Attest:

DOUGLAS B. COMER

Attesting Officer

Acting Commissioner of Patents and Trademarks